(12) United States Patent
Glodack

(10) Patent No.: US 12,460,363 B2
(45) Date of Patent: Nov. 4, 2025

(54) ABSORBENT BAGS FOR BARRIERS

(71) Applicant: Steven Glodack, Hallandale, FL (US)

(72) Inventor: Steven Glodack, Hallandale, FL (US)

( * ) Notice: Subject to any disclaimer, the term of this patent is extended or adjusted under 35 U.S.C. 154(b) by 144 days.

(21) Appl. No.: 18/486,389

(22) Filed: Oct. 13, 2023

(65) Prior Publication Data
US 2025/0122683 A1    Apr. 17, 2025

(51) Int. Cl.
E02B 3/04 (2006.01)
B65D 30/00 (2006.01)
E02B 3/10 (2006.01)

(52) U.S. Cl.
CPC .............. *E02B 3/108* (2013.01); *B65D 29/00* (2013.01)

(58) Field of Classification Search
CPC .......... E02B 3/108; E02B 3/127; E02B 3/126; E02B 3/106; E02D 29/0291; B65D 29/00
See application file for complete search history.

(56) References Cited

U.S. PATENT DOCUMENTS

| | | | | |
|---|---|---|---|---|
| 4,650,368 A * | 3/1987 | Bayer | ................. | E02B 3/127 405/116 |
| 6,524,670 B1 * | 2/2003 | Kataoka | ................. | E02B 3/127 428/36.1 |
| 6,715,960 B2 * | 4/2004 | Metz | ................. | E02B 3/108 405/116 |
| 9,297,134 B1 * | 3/2016 | Dancer | ................. | E02B 3/12 |
| 12,024,841 B2 * | 7/2024 | Combe | ................. | E02B 3/106 |
| 2006/0099033 A1 * | 5/2006 | Boraggina | ................. | E02B 3/108 405/91 |
| 2007/0125568 A1 * | 6/2007 | Kida | ................. | E02B 3/108 174/77 R |
| 2008/0095581 A1 * | 4/2008 | Tasker | ................. | E02B 3/127 405/107 |
| 2008/0250916 A1 * | 10/2008 | Bailey | ................. | F42D 5/045 89/36.02 |
| 2009/0103981 A1 * | 4/2009 | Tagini | ................. | E02B 3/108 405/114 |
| 2010/0232882 A1 * | 9/2010 | Tasker | ................. | E02B 3/127 405/107 |
| 2011/0297575 A1 * | 12/2011 | Bouchard | ................. | E02B 3/108 206/524.3 |
| 2012/0257928 A1 * | 10/2012 | Bailey | ................. | F42D 5/045 405/114 |
| 2013/0309011 A1 * | 11/2013 | Glodack | ................. | E02B 3/127 206/204 |
| 2023/0302768 A1 * | 9/2023 | Shaw | ................. | B32B 1/00 |

OTHER PUBLICATIONS

Zappa Stewart, "Superabsorbent Powders"; "all"; Sep. 24, 2023 (Year: 2023).*

* cited by examiner

*Primary Examiner* — Benjamin F Fiorello

(57) ABSTRACT

A bag for creating temporary barriers. The bag may include an outer casing, a filling port integrated into the casing, and liquid absorbing powder within the casing. To use the bag to create a temporary barrier, the bag may be filled with water and the liquid absorbing powder may absorb the liquid. The bag may then expand and may be stacked with other bags to create the barrier.

1 Claim, 3 Drawing Sheets

Typical Use of Bags When Filled and Placed

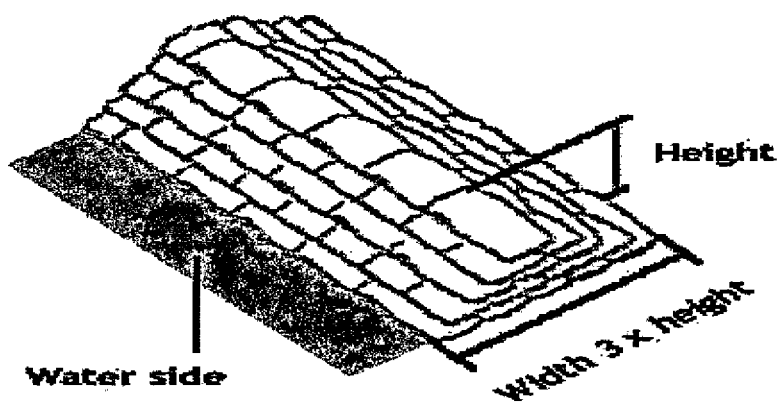
Fig. 1 - Typical Use of Bags When Filled and Placed

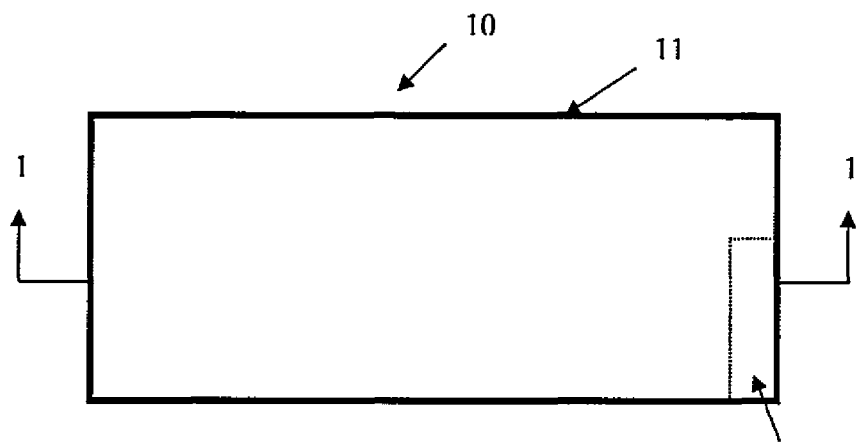
Fig 2 - Plan View of Bag Before Filling
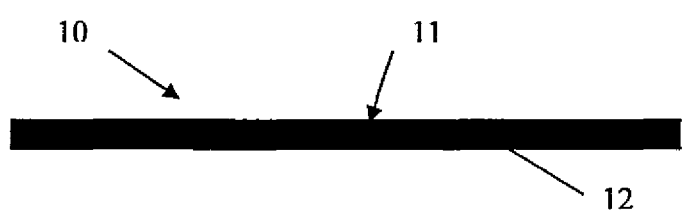
Fig 3 - Section View 1-1 of Bag Before Filling

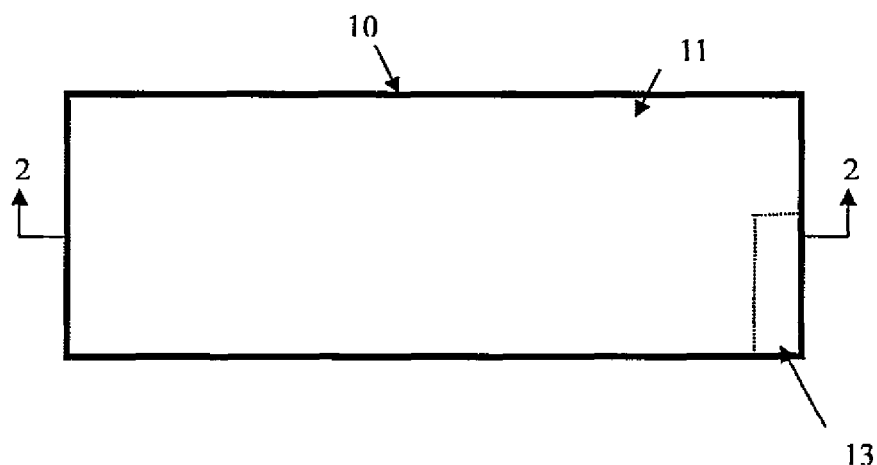
Fig 4 - Plan View of Bag When Filled
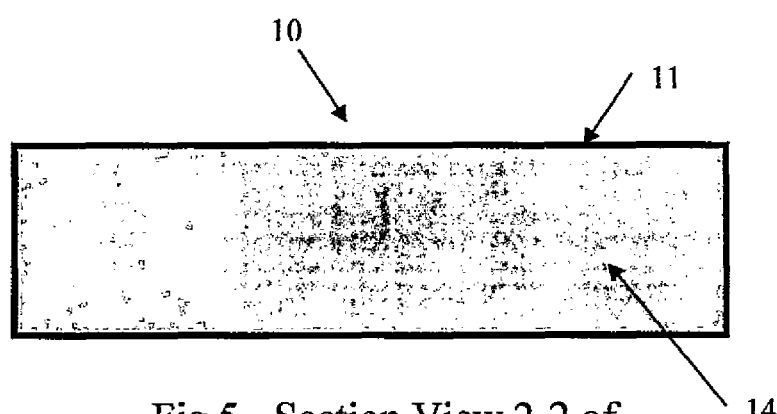
Fig 5 - Section View 2-2 of Bag When Filled

ABSORBENT BAGS FOR BARRIERS

BACKGROUND OF THE INVENTION

The present invention relates to a bag with a filling port containing absorbent material and, more particularly, to a bag containing absorbent material that, when filled with water, can be used for creating temporary barriers.

A sandbag (flood bag) is typically a sack made of burlap, plastic, or other material that is then filled with sand or soil, and then used for such purposes as flood water control, military fortification, building protection in war zones, and ballast. These bags are then used as a temporary barrier. Sandbags may be used in emergencies, such as when flood waters threaten property or when a levee or dike is damaged. They may also be used in non-emergency situations, (or after an emergency), to assist in constructing permanent flood protection structures and for military fortifications and ballast.

Sandbags must be prepared by loading sand, soil, or other material into the bags before use. Typically this is performed by manually placing the material into each bag. Many times these materials are difficult to obtain in emergency conditions. Often times these materials are only available at a significant distance from where the bags are needed. Once the bags are filled, they are very heavy and difficult to move to the location where they are needed.

As can be seen, there is a need for easy-to-use temporary barrier bags that avoid the use of sand or soil.

SUMMARY OF THE INVENTION

In one aspect of the present invention, a temporary barrier bag comprises: an outer casing; a liquid absorbing powder contained within the outer casing; and, a method of filling the outer casing with water.

These and other features, aspects and advantages of the present invention will become better understood with reference to the following drawings, descriptions, and claims.

BRIEF DESCRIPTION OF THE DRAWINGS

Legend to Drawings—List of Absorbent Bag Components

10—Bag
11—Outer Casing
12—Absorbing Powder
13—Filling Port
14—Absorbing Powder and Liquid Mixture FIG. 1 is a perspective view of the typical use as a water containment barrier of the present invention shown in use.

FIG. 2 is a plan view of the present invention showing in a non-expanded state.

FIG. 3 is a section view of the present invention along section line 1-1 of FIG. 2 also in the non-expanded state.

FIG. 4 is a plan view of the present invention showing it in an expanded state.

FIG. 5 is a section view of the present invention along section line 2-2 of FIG. 4 also shown in the expanded state.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a bag for creating temporary barriers. The bag may include an outer casing and a liquid absorbing powder within the casing, and a method for filling the casing with water. To use the bag, water is added to the bag through the self-sealing filling port and the liquid absorbing powder will absorb the water. The water will be absorbed by the absorbing powder within 5 minutes. The bags will then expand and may be placed or stacked to create a barrier.

The present invention may include a casing made of woven fabric or plastic film that will retain the water inside the bag when filled. Some minor leakage of water may occur during filling but is incidental to the functioning of the casing. The casing may be made of woven natural fibers or man-made fibers, which may have been treated to increase the retention of water by the casing. The casing may alternatively be made of man-made plastic material, either woven or film, such as polyethylene, polypropylene, polyvinylchloride, or other suitable material which may also have been treated to increase the retention of water.

The present invention may only weigh less than 16 ounces until the water is added. Once the present invention has added water, the bag may weigh between 30 and 80 pounds. The weight will depend on the size of the bag that is used.

The present invention utilizes a liquid absorbing powder made of cross-linked sodium polyacrylate and potassium polyacrylamide polymer. The powder is placed within the casing during the manufacture of the bag. Nothing but water is needed to be added to the bag. This powder is a super absorbent material that will absorb over fifty (50) times its weight of water. This material allows the bag to expand after water is added through the self-sealing filling port. The resultant gel-like mixture of water and absorbent powder is contained within the casing, and creates a bag of sufficient weight to be used for a temporary barrier. Only the addition of water is required to deploy the present invention.

Water is added to the bag via the self-sealing filling port that is an integral part of the outer casing. Water may be added using a common garden hose or any other small diameter hose connected to a water supply. The self-sealing filling port is largely self-sealing after the filling hose is withdrawn, but complete closing is not required. After the liquid is absorbed by the powder, little if any of the liquid-powder mixture will leak out. Water is not added in any significant amount by soaking through the outer casing.

Referring to FIGS. 1 through 5, the present invention may include a bag 10. The bag 10 may include an outer casing 11. The outer casing may be constructed of woven fabric or plastic film. Within the outer casing 11 of the bag 10 may include a liquid absorbing powder 12. The liquid absorbing powder 12 may be 6-12 ounces of cross-linked sodium polyacrylate and potassium polyacrylamide polymer. However, it is envisioned that more or less liquid absorbing powder 12 may be used. The outer casing may contain a filling port 13.

As illustrated in FIG. 3, the bag 10 of the present invention may be compact and not expanded prior to use. The bags may be stored in vacuum sealed plastic containers prior to use to prevent the intrusion of moisture into the unused bags. The bag 10 may also be very lightweight prior to use. When the bag 10 needs to be used, the bag 10 may have water added using the filling port 13. The liquid absorbing powder 12 may absorb the liquid and expand. As illustrated in FIG. 5, the bag 10 may then be in the expanded form and may include a mixture of the liquid absorbing powder 12 and a liquid such as water forming a mixture 14. As illustrated in FIG. 1, once in the expanded form, similar bags 10 may be stacked to create a wall to prevent water from entering a protected area. The bags may be stacked in the same manner that conventional sand bags are utilized.

What is claimed is:

1. A temporary barrier system comprising:
   a plurality of absorbent bags, wherein each absorbent bag comprises:
      an outer casing that is substantially impermeable;
      a liquid absorbing powder within the outer casing, wherein the powder consists of a cross-linked sodium polyacrylate and potassium polyacrylamide polymer; wherein the powder is configured to absorb at least fifty times its weight in water to form a gel-like mixture to expand the absorbent bag;
      an integral self-sealing port in the casing for adding water to the absorbent bag, wherein the self-sealing port is configured to self-seal without closure of the port in that the gel-like mixture will not leak out; and;
   the plurality of absorbent bags are configured to be stacked upon one another to create the temporary barrier system.

* * * * *